Aug. 10, 1965     G. R. LEFEVRE     3,199,173
METHOD OF MAKING A FLANGED BEARING
Filed Oct. 29, 1962     2 Sheets-Sheet 1
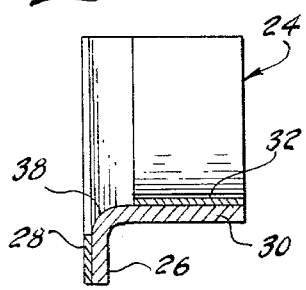
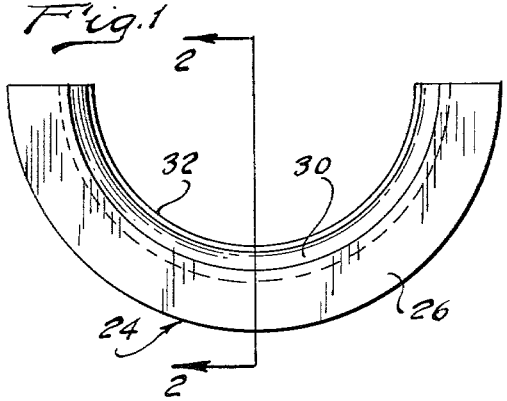
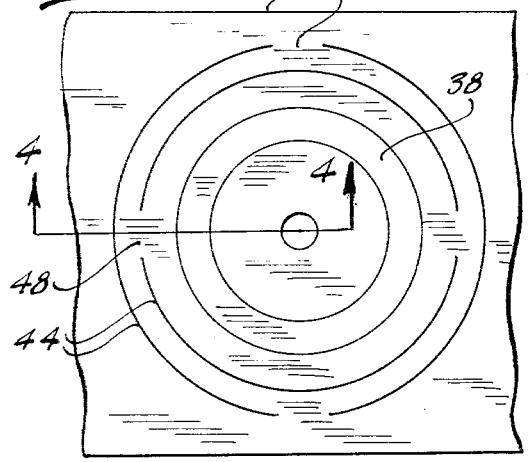
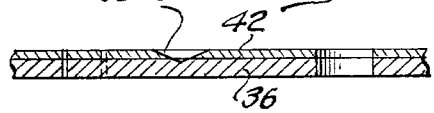
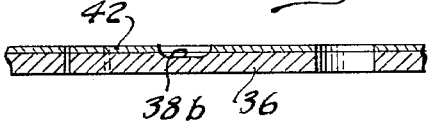
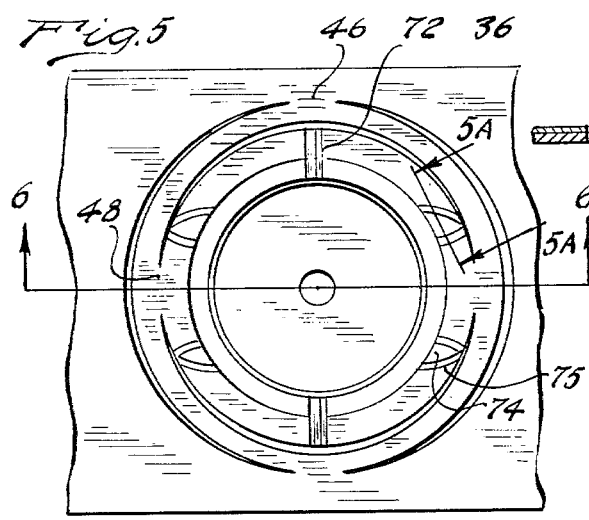
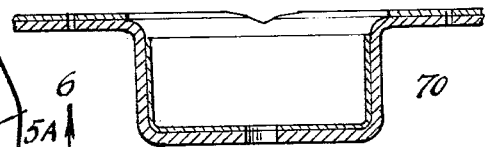
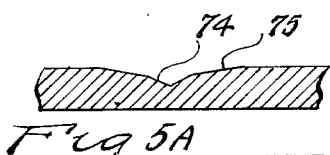
INVENTOR.
GEORGE R. LEFEVRE
BY Whittemore,
Hulbert & Belknap
ATTORNEYS.

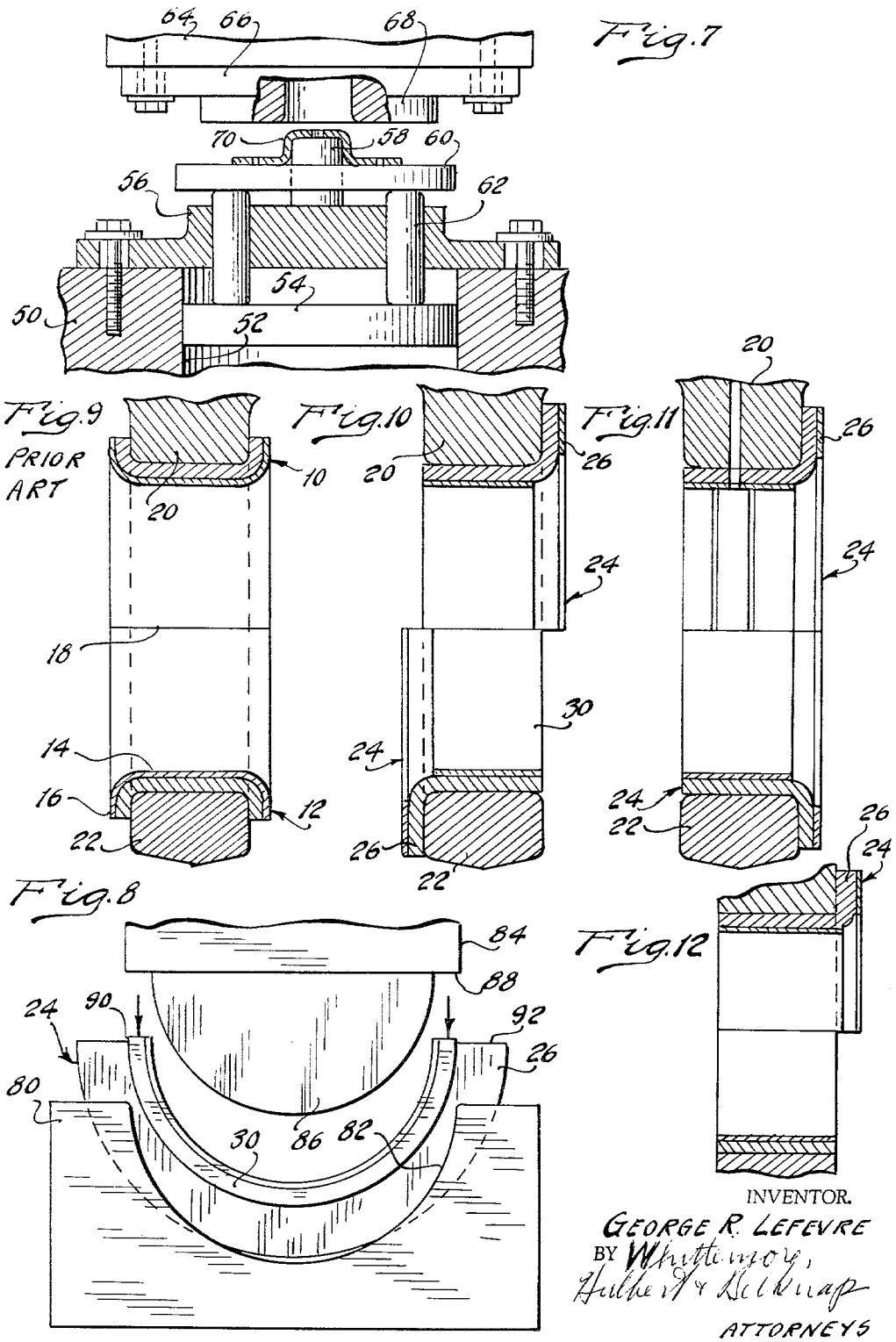

# United States Patent Office 3,199,173
Patented Aug. 10, 1965

3,199,173
METHOD OF MAKING A FLANGED BEARING
George R. Lefevre, Birmingham, Mich., assignor, by mesne assignments, to Universal American Corporation, New York, N.Y., a corporation of Delaware
Filed Oct. 29, 1962, Ser. No. 233,546
21 Claims. (Cl. 29—149.5)

The present invention relates to a method of making a flanged bearing.

It is an object of the present invention to provide a novel method of making a flanged cylindrical sleeve or journal bearing which comprises forming an intermediate portion of a flat sheet into a cup shape having a cylindrical side wall, flattening the sheet surrounding the cup into a flange radial of said cup, and removing the bottom of said cup.

It is a further object of the present invention to provide a method as described in the preceding paragraph in which the step of shaping the cup is performed by drawing.

It is a further object of the present invention to provide a method as described in the immediately preceding paragraphs in which, following the formation of the cup, the flange surrounding the cup is flattened and shaped by a coining operation.

It is a further object of the present invention to provide a method as described in the preceding paragraph in which the step of coining the radial flange surrounding the cup includes the step of forming radial relief grooves and/or thumbnail grooves therein.

It is a further object of the present invention to provide a method as described in the preceding paragraphs which includes the step of severing the flanged cup into two substantially 180° halves.

It is a further object of the present invention to provide a method as defined in the preceding paragraph in which the half bearings produced by separating the flanged cup are dimensioned as to parting line height by a coining operation in which the cylindrically formed journal portion of the bearing is supported between a recessed coining block and a pad, and coining pressure is applied to the axially extending edge surfaces of the journal portion of the bearing.

Other objects and features of the invention will become apparent as the description proceeds, especially when taken in conjunction with the accompanying drawings, illustrating preferred embodiments of the invention, wherein:

FIGURE 1 is an end view of a flanged bearing constructed in accordance with the present invention.

FIGURE 2 is a section on the line 2—2, FIGURE 1.

FIGURE 3 is a fragmentary plan view of strip material from which the flanged bearings are formed.

FIGURE 4A is a fragmentary section on the line 4—4, FIGURE 3, showing one form of flange-to-body undercut.

FIGURE 4B is a view similar to FIGURE 4A illustrating a somewhat different form of flange-to-body undercut.

FIGURE 5 is a plan view of a flanged cup as produced by a drawing and cutting operation performed on the strip material of FIGURE 3.

FIGURE 5A is an enlarged section on the line 5A—5A, FIGURE 5.

FIGURE 6 is a sectional view on the line 6—6, FIGURE 5.

FIGURE 7 is a schematic view illustrating the apparatus used in performing the draw operation.

FIGURE 8 is a schematic view illustrating the apparatus employed in performing the edge coining operation.

FIGURE 9 is a simplified sectional view illustrating the combined journal and thrust bearings as employed in the prior art.

FIGURE 10 is a view similar to FIGURE 9 illustrating one mode of employing the segmental flanged bearings of the present invention.

FIGURE 11 is a view similar to FIGURE 10 illustrating yet another mode of employing the flanged bearings of the present invention.

FIGURE 12 is a view similar to FIGURE 10 illustrating yet another mode of employing the flanged bearing of the present invention.

Referring first to FIGURE 9 there is illustrated a combined journal and thrust bearing assembly as known to the prior art. In this figure the bearing assembly comprises two 180° segmental bearings 10 and 12 each of which includes a cylindrical intermediate portion 14 and a radially extending flange or thrust bearing portion 16.

In order that bearings of this type shall fit properly in the mounting structure indicated generally as comprising a recessed base 20 and removable cap 22, the dimensions between confronting surfaces of the flanges 16 must be maintained with great accuracy and in practice, this dimension is determined by a GO or NO-GO bar gauge and the dimension is frequently required to be held to .002″.

Bearings of this type are conventionally made from strip stock which is formed into an elongated straight channel with the side walls thereof either parallel or diverging outwardly from the intermediate portion of the strip. Thereafter, the strip is bent into semi-cylindrical or partially cylindrical configuration. If the flange portions at this time extend obliquely outwardly, they are thereafter shaped to extend radially of the cylindrically formed intermediate portion. A serious drawback and limitation to this method of producing flanged bearings is that the area of the flange is severely limited. It will be apparent that the formation of the channel strip into arcuate configuration results in tension being applied, concentrated at the outer edges of the flanges. If these flanges are of substantial size, the material splits, thins, or is subjected to flow under tension sufficient to cause cracking or damage to bearing material carried thereon.

In accordance with the present invention flanged bearings of the type illustrated in FIGURES 1 and 2, indicated at 24, are provided characterized in the capability of having flanges 26 of any useful size without thinning or cracking or injury to bearing material 28 carried thereon. The particular method of producing these bearings is such that the metal of the radial flange portions 26 thereof is actually under internal circumferential compression. The bearing shown in FIGURES 1 and 2 includes a semi-cylindrical sleeve or journal portion 30 provided with bearing material 32 bonded thereto.

The method of producing the bearing shown in FIGURES 1 and 2 is illustrated in FIGURES 3–7. The material from which the bearing is made is preferably in the form of a strip 36 formed of suitable material such for example as steel provided with a coating of bearing material such for example as aluminum, copper-lead, or the like. Conveniently, this strip material is advanced through a progressive die set for performance of the required operations. Bearing material is removed from an annular zone 38 which occupies the junction between the cylindrical journal portion and the flat thrust bearing portion designated 26 in FIGURE 2. As best seen in FIGURES 4A and 4B, the strip 36 provided with the bearing material here indicated as 42, has the zone 38 of FIGURE 3 somewhat differently formed. In FIGURE 4A the zone is of generally V-shaped cross-section as indicated at 38a, while in the form of the invention illustrated in FIGURE 4B, the zone has a generally U-shaped cross-section as indicated at 38b.

The strip material is advanced in a step by step relation through the progressive die. At a first station the strip is subjected to a punching and cutting operation to provide the material as illustrated in FIGURE 3. At this point substantially semi-circular cuts 44 are taken which are discontinuous at diametrically opposite pairs of hold-on points indicated at 46 and 48. These cuts provide for the generally radially inward movement of the material of the bearing flange as the cup portion is formed in a subsequent operation, while at the same time the material which is to become the bearing is retained in proper location on the advancing strip.

Referring now to FIGURE 7 there is more or less diagrammatically illustrated the draw station of the progressive die. At this station the press base 50 includes a cylinder 52 in which the piston 54 is vertically movable. Secured to the base is a lower die shoe 56 carrying a die plug 58. A draw pad 60 having a central opening receiving the die plug 58 is mounted for vertical movement relative to the lower die shoe 56 and is adapted to be moved upwardly by draw pins 62 actuated by the piston 54.

The ram 64 carries an upper die shoe 66 and an annular die 68 shaped to cooperate with the die plug 58 and the draw pad to form the partially severed material of the strip into the cup shape indicated at 70.

At this time the cup 70 remains attached to the strip 36 by means of the hold-ons 46 and 48, and when separated from the die plug 58 may be advanced to the next station.

While FIGURES 3 and 5 indicate pairs of hold-ons 46 and 48 located 90° from each other, it will be appreciated that if the strip 36 is only slightly wider than the outside diameter of the flange of the bearing, the hold-ons illustrated at 46 may be omitted and the material at the edge of the strip will deform inwardly as the metal is drawn into cup formation.

The draw operation performed as indicated in FIGURE 7, allows design of a bearing having a flange portion 26 of any required size. The material which constitutes the radial flange of the finished bearing is initially provided in the plane which it ultimately occupies so that it is not subjected to the circumferentially acting tensile stresses inherent in the prior production method which involves bending the channel-shaped structure into arcuate configuration. On the contrary, the drawing of the cup centrally of the partially struck out portion of the strip actually draws the metal of the flange portion thereof toward the cup with a resultant establishment of circumferentially acting compressive stresses. Accordingly, thinning, edge tearing, cracking, or other damage to the bearing material is avoided.

Following the draw operation the strip with the partially severed cupped bearing portion is advanced to the next station where the radial flange of the bearing portion is struck in a coining press. This operation is suggested in FIGURES 5 and 6 where parting line relief grooves 72 are coined into the thrust bearing surface of the flange portion. In addition, other formations may be provided such as oil grooves, thumbnail grooves 74, which may include Michell groove 75, and the like. This operation of course also flattens and dimensions the flange portion of the bearing. At the same or at additional stations the bottom of the cup is blanked out and the flange O.D. is preferably trimmed to finished size.

Thereafter, the flanged cup is severed as for example by sawing or shearing along the parting line located centrally of the relief groove 72.

In the production of bearings of this type it is necessary that the bearing be formed to extend somewhat over 180° to allow for finish facing of the parting line edge and to allow additional height, referred to as "crush height" so that when the two half-bearings are assembled, the vertical bore diameter shall be slightly greater than the horizontal bore diameter. The amount by which the vertical bore diameter exceeds the horizontal bore diameter depends upon the bearing diameter, the wall size, and the material used. In any case, the dimension is such that when the bearing cap is bolted down in place the vertical bore diameter approaches or equals the horizontal bore diameter since the material at the parting line edges of the bearing shall yield. This crush is what keeps the bearing from moving.

It will be appreciated that if the cup portion of the bearing in accordance with the present invention, were drawn to exact circular cross-section, and if the flanged cup were then cut into two by a sawing operation, each of the two halves of the journal portion of the bearing would occupy slightly less than 180°. This undesirable situation can be avoided by employing one or both of the following procedures.

In the first place, the cup may initially be drawn so as to be of generally oval cross-section. Specifically, the cross-sectional shape should consist of two full 180° end portions interconnected by straight sided portions having a length slightly greater than the width of a saw cut if the bearing is separated into two parts by sawing. If the bearing is separated into two parts by a shearing operation, the length of the straight sided wall portions connecting the semi-cylindrical end portions may be correspondingly reduced. With this combination the excess material at the straight sided wall portions over the material lost in the severing operation leaves material for finish facing and additional material to provide the necessary "crush height."

The bearing halves after assembly are preferably coined in an operation illustrated in FIGURE 8. In this figure a coining block 80 is provided having a semi-cylindrical recess 82 adapted to receive the semi-cylindrical journal bearing portion 30 of the semi-cylindrical flanged bearing. The upper coining block 84 having a substantially semi-cylindrical pad 86 is moved downwardly on a ram and is provided with coining shoulders 88 engageable with the axially extending parting edges 90 of the journal portion 30 of the bearing 24. By appropriate dimensioning of the coining apparatus, the bearing may be upset so as to produce an exactly sized bearing having the requisite crush height in excess of the normal 180° angular extent.

It will of course be apparent that the parting line relief groove 72 prevents one edge of the thrust bearing portion from projecting outwardly beyond the adjacent edge of the companion bearing portion when the two are assembled together with the thrust flanged bearing portions facing in the same direction.

In some cases it may be necessary or desirable to draw the cup in a plurality of draw steps, which of course may be accomplished conveniently by providing a series of progressive stations. In any case, the final draw of the cup may produce the final size, finish and squareness of the journal bearing portion and further, results in effective burnishing of the outside surface of the cup.

While the most efficient large scale production of flanged bearings is accomplished as described heretofore from strip material in a progressive die, it will of course be apparent that the essential operation may be performed on separate precut pieces of flat stock.

Finally, the bearings are completed as usual by circle grooving, punching, oil grooves, broaching, etc.

Referring now to FIGURES 10 and 11 there are shown two alternative manners of employing the finished bearings.

In the first place, it may be mentioned that a limitation previously imposed on bearing design was due to the inability to produce the thrust bearing of adequate size. In the prior art, as illustrated in FIGURE 9, it was necessary to employ two mating bearing halves so that the total area of the flanges 16 provided adequate bearing area. In accordance with the present invention the radial flange of the bearing may be of any required dimension and hence, it is found that thrust may be adequately opposed by the area of a single bearing half. Thus, in FIGURE 10 the bearings 24 are assembled with the flange portions 26 thereof facing in opposite directions. This is of particular advantage over the prior art arrangement illustrated in FIGURE 9, which requires maintenance of highly accurate spacing between the confronting surfaces of the flanges at opposite ends of each bearing half. With the present construction, since each bearing is provided with a thrust bearing at only one end thereof, this problem does not arise.

The arrangement in FIGURE 10 is of course effective to provide a shaft bearing by the coaction of the cylindrical portions 30 as well as the two opposed thrust bearings provided by the flange portions 26.

Alternatively, if thrust is present in a single direction, the bearings 24 may be assembled as illustrated in FIGURE 11 where the flange portions 26 thereof face in the same direction. In this case, severance of the flanged cupped product along the parting line groove, as previously described, prevents edge interference with the surface engaging the thrust bearing formed by the two flanges 26.

Finally, the bearing assembly may be provided as illustrated in FIGURE 12 in which the flanged upper half shell 24 is provided with the flange portion 26 on the main thrust side only. The lower half-bearing is unflanged.

The production of bearings in accordance with the present invention has many advantages over the prior art.

In the first place, only one press setup is required, and two flanged bearings are formed for each stroke of the press. In this connection one master die is employed which produces a large variety of sizes by changing die and punch inserts. This of course reduces tool costs for flanged bearings.

A most important advantage of the present invention results in the nature of the stresses applied to the material. Since the bimetal material (bearing coated backing metal) is subject to compressive stresses, at least near the outside of the flange portion, scrap is eliminated since cracking of the bearing and/or other damage to the bearing material is not a problem.

Flange height or usable thrust area can be greatly increased since the bearing design is not limited by the requirement of staying within the elongation limits of steel backing in the production of the flange.

A further important advantage is in the elimination of the requirement of maintaining a critical bearing gauge size between confronting flange surfaces at opposite ends of the bearing as is now required. With the present invention, as described above, this is avoided since each bearing element is provided with a radial flange portion at only one end thereof.

Manufacture in accordance with the present invention permits the economical formation of thrust surface grooves such as thumbnail or other grooves, which may be coined in the thrust surface, thus eliminating separate machining operations now employed.

A further advantage of the present invention is that flange thickness can be held accurately, thus eliminating a finish face operation.

In addition, in practicing the present invention one design setup may produce various sizes of bearings within reasonable limits by using the basic part in different size coin blocks of the type disclosed in FIGURE 8.

Carrying out the invention as described herein in a progressive die permits forming the outside diameter of the flange and any desired chamfer thereon to the required size in a single operation, thus further eliminating subsequent machine operation.

Production of prior art bearings of the type illustrated in FIGURE 9 requires the machining of angular reliefs on the flange ends. This is of course eliminated for most usage by the present invention, since in the bearing assembly a single thrust flange is provided at each end of the bearing assembly.

Flange face relief is coined on the thrust face on the parting line, thus eliminating a further usual subsequent machine operation. The flange-to-body undercut is preferably coined or otherwise machined on the strip in the flat, as illustrated in FIGURES 4A and 4B.

It may be further noted that while the present bearing assembly as illustrated in FIGURE 10, provides only a half thrust bearing at each side of the assembly, this often was the practical result of the prior art assembly illustrated in FIGURE 9. Thus, where one bearing flange was somewhat thicker than the other, it assumed the entire thrust load. In any case, it has been found that the provision of a generally 180° segmental thrust bearing of adequate size, in accordance with the present invention, is fully equivalent to the use of a 360° thrust bearing of commensurate size. Furthermore, with the present invention it is possible to provide more area in a 180° segmental thrust bearing than was possible in the complete 360° thrust bearing of the prior art, if this is required.

While it has been pointed out that practice of the invention as described in the foregoing using a progressive die may be carried out so as to eliminate many machine operations, in its broader aspect the invention involves essentially the steps of drawing a generally cylindrical cup shape intermediate the edges of a flat blank, and removing the bottom of the cup. Where the bearing is to be employed in the form of half bearing portions, the flanged tubular construction resulting from the foregoing is severed by sawing on a diametral plane.

The drawings and the foregoing specification constitute a description of the improved flanged bearing and the method of making the same, in such full, clear, concise and exact terms as to enable any person skilled in the art to practice the invention, the scope of which is indicated by the appended claims.

What I claim as my invention is:

1. The method of making a flanged bearing comprising the steps of providing a bonded layer of soft bearing metal on flat stock of a ferrous metal, drawing a cup having a cylindrical side wall from an intermediate area of the flat stock, leaving a flat radial flange surrounding said cup, and removing the bottom of the cup.

2. The method of making a flanged bearing comprising the steps of providing a bonded layer of soft bearing metal on flat stock of a ferrous metal, substantially severing a circular area from the flat stock to provide for radial inward movement of peripheral portions thereof, drawing a cup having a cylindrical side wall from the central portion of said circular area, maintaining the peripheral portions of said circular area in their original plane, and removing the bottom of the cup.

3. The method of making flanged bearings from flat stock of ferrous metal having a layer of bearing metal bonded to one side thereof which comprises forming two radially spaced concentric circular cuts in the stock, each of said cuts being discontinuous at zones of limited angular extent located diametrically opposite each other, the said zones of one cut being separated circumferentially from the zones of the other cut, drawing a cup having a cylindrical side wall in the central portion of the circular area within the inner one of said circular cuts while retaining the peripheral portion of said circular area as a radial flange on said cup, and removing the bottom of the cup.

4. The method of making flanged bearings from flat stock of ferrous metal having a layer of bearing metal bonded to one side thereof which comprises forming two radially spaced concentric circular cuts in the stock, each of said cuts being discontinuous at zones of limited angular extent located diametrically opposite each other, the said zones of one cut being separated circumferentially from the zones of the other cut, drawing a cup having a cylindrical side wall in the central portion of the circular area within the inner one of said circular cuts while retaining the peripheral portion of said circular area as a radial flange on said cup, removing the bottom of the cup, and severing the flange cup into halves along a plane containing the axis thereof.

5. The method of making flanged bearings from flat stock of ferrous metal having a layer of bearing metal bonded to one side thereof which comprises forming two radially spaced concentric circular cuts in the stock, each of said cuts being discontinuous at zones of limited angular extent located diametrically opposite each other, the said zones of one cut being separated circumferentially from the zones of the other cut, drawing a cup having a cylindrical side wall in the central portion of the circular area within the inner one of said circular cuts while retaining the peripheral portion of said circular area as a radial flange on said cup, coining aligned flange face relief grooves in the surface of said flange facing outwardly of said cup extending along a diameter thereof, removing the bottom of the cup, and severing the flanged body along a diametral plane coincident with said relief grooves.

6. The method of making flanged bearings from flat stock of ferrous metal having a layer of bearing metal bonded to one side thereof which comprises forming two radially spaced concentric circular cuts in the stock, each of said cuts being discontinuous at zones of limited angular extent located diametrically opposite each other, the said zones of one cut being separated circumferentially from the zones of the other cut, drawing a cup having a cylindrical side wall in the central portion of the circular area within the inner one of said circular cuts while retaining the peripheral portion of said circular area as a radial flange on said cup, coining aligned flange face relief grooves in the surface of said flange facing outwardly of said cup extending along a diameter thereof, removing the bottom of the cup, severing the flanged body along a diametral plane coincident with said relief grooves, and coining the side edges of the semi-cylindrical wall formed by severing the flanged body to produce the required parting line height.

7. The method of making flanged bearings from flat stock of ferrous metal having a layer of bearing metal bonded to one side thereof which comprises forming two radially spaced concentric circular cuts in the stock, each of said cuts being discontinuous at zones of limited angular extent located diametrically opposite each other, the said zones of one cut being separated circumferentially from the zones of the other cut, drawing a cup having a cylindrical side wall in the central portion of the circular area within the inner one of said circular cuts while retaining the peripheral portion of said circular area as a radial flange on said cup, coining aligned flange face relief grooves in the surface of said flange facing outwardly of said cup extending along a diameter thereof, removing the bottom of the cup, severing the flanged body along a diametral plane coincident with said relief grooves, and coining the side edges of the semi-cylindrical wall formed by severing the flanged body by supporting the semi-cylindrical portion of said body between concave and convex cylindrical blocks while striking the said side edges to produce the required parting line height.

8. The method of making flanged bearings which comprises advancing a bimetal strip comprising a strip of ferrous metal having a layer of bearing metal bonded to one side thereof through a progressive die, at a first station partially severing a substantially circular area from said strip to provide for radial inward movement of the peripheral portions of said circular area, at a later station drawing the central portion of said circular area into a cup having a cylindrical side wall and simultaneously pulling peripheral portions of said area radially inward to develop circumferential internal compression, and at a later station blanking out the bottom of said cup.

9. The method of making flanged bearings which comprises advancing a bimetal strip comprising a strip of ferrous metal having a layer of bearing metal bonded to one side thereof through a progressive die, at a first station partially severing a substantially circular area from said strip to provide for radial inward movement of the peripheral portions of said circular area, at a later station drawing the central portion of said circular area into a cup having a cylindrical side wall and simultaneously pulling peripheral portions of said area radially inward to develop circumferential internal compression, at a later station blanking out the bottom of said cup, and finally severing the body on a diametral plane.

10. The method of making a bearing having a semi-cylindrical sleeve and a flat radial flange at one end only thereof which comprises advancing continuous bimetal strip comprising a strip of ferrous metal having a layer of bearing metal bonded to one side thereof through a progressive die, partially severing a circular area from said strip at a first station, advancing the circular area to a second station and there drawing a cup from the central portion of said circular area and drawing peripheral portions of said area radially inwardly in the plane of said strip to define a radial flange on said cup, advancing the flanged cup to a third station and there blanking the bottom wall from the cup.

11. The method of making a bearing having a semi-cylindrical sleeve and a flat radial flange at one end only thereof which comprises advancing continuous bimetal strip comprising a strip of ferrous metal having a layer of bearing metal bonded to one side thereof through a progressive die, partially severing a circular area from said strip at a first station, advancing the circular area to a second station and there drawing a cup from the central portion of said circular area and drawing peripheral portions of said area radially inwardly in the plane of said strip to define a radial flange on said cup, advancing the flanged cup to a third station and there blanking the bottom wall from the cup, and coining a diametrical parting line groove in said flange.

12. The method of making a bearing having a semi-cylindrical sleeve and a flat radial flange at one end only thereof which comprises advancing continuous bimetal strip comprising a strip of ferrous metal having a layer of bearing metal bonded to one side thereof through a progressive die, partially severing a circular area from said strip at a first station, advancing the circular area to a second station and there drawing a cup from the central portion of said circular area and drawing peripheral portions of said area radially inwardly in the plane of said strip to define a radial flange on said cup, advancing the flanged cup to a third station and there blanking the bottom wall from the cup, trimming the peripheral edge of said flange to required size and severing the flanged cup from said strip, and coining a diametrical parting line groove in said flange.

13. The method of making a bearing having a semi-cylindrical sleeve and a flat radial flange at one end only thereof which comprises advancing continuous bimetal strip comprising a strip of ferrous metal having a layer of bearing metal bonded to one side thereof through a progressive die, partially severing a circular area from said strip at a first station, advancing the circular area to a second station and there drawing a cup from the central portion of said circular area and drawing peripheral portions of said area radially inwardly in the plane of said strip to define a radial flange on said cup, advancing the flanged cup to a third station and there blanking the bottom wall from the cup, trimming the peripheral edge of said flange to required size and severing the flanged cup from said strip, coining a diametrical parting line groove in said flange, removing the flanged cup from the die, and severing the flanged cup into diametral halves along a diametral plane coincident with said parting line groove.

14. The method of making a bearing having a semi-cylindrical sleeve and a flat radial flange at one end only thereof which comprises providing a continuous bimetal strip having bearing material at one side thereof, forming a series of annular flange-to-body undercuts at the bearing side of said strip, advancing the strip in step by step relation through a progressive die, at a first station in said die partially severing a circular area concentric with said annular undercut and of substantially greater size to provide for substantially unrestricted radial inward movement of peripheral portions of said circular area, advancing said strip to locate said partially severed circular area at a second station and there drawing the metal within said undercut into a cup having a cylindrical side wall while leaving the portion of said strip between said circular undercut and the periphery of said circular area as a flat radial flange on said cup, advancing said strip to position said flanged cup at a further station and there blanking the bottom wall from said cup.

15. The method of making a bearing having a semi-cylindrical sleeve and a flat radial flange at one end only thereof which comprises providing a continuous bimetal strip having bearing material at one side thereof, forming a series of annular flange-to-body undercuts at the bearing side of said strip, advancing the strip in step by step relation through a progressive die, at a first station in said die partially severing a circular area concentric with said annular undercut and of substantially greater size to provide for substantially unrestricted radial inward movement of peripheral portions of said circular area, advancing said strip to locate said partially severed circular area at a second station and there drawing the metal within said undercut into a cup having a cylindrical side wall while leaving the portion of said strip between said circular undercut and the periphery of said circular area as a flat radial flange on said cup, advancing said strip to position said flanged cup at a further station and there blanking the bottom wall from said cup, and severing said flange from said strip.

16. The method of making a bearing having a semi-cylindrical sleeve and a flat radial flange at one end only thereof which comprises providing a continuous bimetal strip having bearing material at one side thereof, forming a series of annular flange-to-body undercuts at the bearing side of said strip, advancing the strip in step by step relation through a progressive die, at a first station in said die partially severing a circular area concentric with said annular undercut and of substantially greater size to provide for substantially unrestricted radial inward movement of peripheral portions of said circular area, advancing said strip to locate said partially severed circular area at a second station and there drawing the metal within said undercut into a cup having a cylindrical side wall while leaving the portion of said strip between said circular undercut and the periphery of said circular area as a flat radial flange on said cup, advancing said strip to position said flanged cup at a further station and there blanking the bottom wall from said cup, coining a diametral parting line groove on said flange, severing said flange from said strip, and finally separating said flanged body into halves along a diametral plane coincident with said parting line groove.

17. The method of making flanged bearings which comprises drawing a generally cylindrical cup from an intermediate area of flat stock, leaving a flat radial flange surrounding said cup, and removing the bottom of said cup.

18. The method of making flanged bearings which comprises drawing a generally cylindrical cup from an intermediate area of flat stock of ferrous metal having a layer of bearing metal bonded to one side thereof, leaving a flat radial flange surrounding said cup, removing the bottom of said cup, and severing the resulting flanged tubular member on a diametral plane.

19. The method of making flanged bearings which comprises drawing a generally cylindrical cup from an intermediate area of flat stock of ferrous metal having a layer of bearing metal bonded to one side thereof, leaving a flat radial flange surrounding said cup, removing the bottom of said cup, severing the resulting flanged tubular member on a diametrical plane to form bearings having an angular extent of less than 180°, and coining the bearings in a coining die by the application of coining pressure to the edges of the cylindrically formed portion to reduce the diameter thereof and to form the cylindrical formed portion to a full 180° extent.

20. The method of making flanged bearings which comprises drawing a generally cylindrical cup from an intermediate area of flat bimetal stock having bearing metal of the side thereof forming the interior of said cup, leaving a flat radial flange surrounding said cup, coining aligned flange face relief grooves in the bearing metal surface of said flange facing outwardly of said cup, removing the bottom of said cup, and severing the resulting flanged tubular member on a diametral plane coincident with said relief grooves.

21. The method of making flanged bearings which comprises drawing a generally cylindrical cup from an intermediate area of flat stock of ferrous metal having a layer of bearing metal bonded to one side thereof, the cup having a slightly elongated cross-section, leaving a flat radial flange surrounding said cup, removing the bottom of said cup, and severing the resulting flanged tubular member on the minor diameter of its transversely elongated cup portion to form segmental cylindrical portions having angular extents of a full 180°.

References Cited by the Examiner

UNITED STATES PATENTS

| 7,385 | 5/50 | Schile | 308—135 |
|---|---|---|---|
| 1,228,352 | 5/17 | Swenson | 29—148.4 |
| 1,387,638 | 8/21 | Bingham | 29—148.4 |
| 1,630,715 | 5/27 | Nice | 29—149.5 |
| 1,848,569 | 3/32 | Leggett | 308—135 |
| 2,403,645 | 7/46 | Etchells | 29—149.5 |
| 2,915,908 | 12/59 | Warnkey | 29—539 |

WHITMORE A. WILTZ, *Primary Examiner.*

THOMAS H. EAGER, *Examiner.*